(12) United States Patent
Duspiva et al.

(10) Patent No.: US 6,954,523 B2
(45) Date of Patent: Oct. 11, 2005

(54) METHOD FOR PROVIDING A SERVICE IN A TELECOMMUNICATION NETWORK AND A CORRESPONDING INFRASTRUCTURE MANAGER

(75) Inventors: Gabriele Duspiva, Leonberg (DE); Wolfgang Lautenschlager, Weissach-Flacht (DE)

(73) Assignee: Alcatel, Paris (FR)

( * ) Notice: Subject to any disclaimer, the term of this patent is extended or adjusted under 35 U.S.C. 154(b) by 495 days.

(21) Appl. No.: 09/801,693

(22) Filed: Mar. 9, 2001

(65) Prior Publication Data

US 2001/0026612 A1 Oct. 4, 2001

(30) Foreign Application Priority Data

Mar. 10, 2000 (EP) .............................. 00440072

(51) Int. Cl.⁷ ................................ H04M 7/00
(52) U.S. Cl. ......................... 379/207.02; 379/221.08; 379/221.09
(58) Field of Search .................. 379/207.02, 229, 379/230, 242, 243, 244, 245, 246, 219, 220.01, 221.1, 221.08, 221.09, 221.13, 221.14, 221.01, 201.01

(56) References Cited

U.S. PATENT DOCUMENTS

| | | | | |
|---|---|---|---|---|
| 5,884,179 A | * | 3/1999 | Patel .......................... 455/445 |
| 5,963,630 A | * | 10/1999 | Dabbs et al. .......... 379/201.01 |
| 6,028,924 A |   | 2/2000 | Ram et al. |
| 6,137,806 A | * | 10/2000 | Martinez ..................... 370/428 |
| 6,393,121 B1 | * | 5/2002 | Tuunanen et al. ........... 379/230 |
| 6,411,604 B1 | * | 6/2002 | Brockman et al. ........... 370/244 |
| 6,526,134 B1 | * | 2/2003 | Wallenius .............. 379/201.01 |
| 6,556,996 B1 | * | 4/2003 | Kovarik ......................... 707/10 |
| 6,560,326 B1 | * | 5/2003 | Clark ..................... 379/221.08 |
| 6,560,327 B1 | * | 5/2003 | McConnell .................. 379/229 |
| 6,597,701 B1 | * | 7/2003 | Howell ........................ 370/410 |
| 6,636,588 B2 | * | 10/2003 | Kimura et al. .......... 379/112.04 |
| 6,667,969 B1 | * | 12/2003 | Sevcik ......................... 370/352 |
| 6,763,008 B2 | * | 7/2004 | Verkama et al. ............. 370/331 |

FOREIGN PATENT DOCUMENTS

| | | | |
|---|---|---|---|
| DE | 1 005 239 A2 | * 5/2000 | ............ H04Q/3/00 |
| EP | 0 886 446 A2 | 12/1998 | |
| EP | 0 912 069 A2 | 4/1999 | |
| WO | WO 96/20448 | 7/1996 | |

OTHER PUBLICATIONS

J.P. Euzen et al, "Intelligent Network Products" Electrical Communication, vol. 63, No. 4–1989, pp. 321–330.

* cited by examiner

Primary Examiner—William J. Deane, Jr.
(74) Attorney, Agent, or Firm—Sughrue Mion, PLLC

(57) ABSTRACT

The invention relates to a method for providing services in a telecommunications network comprising at least a service switching unit able to access a service control plane comprising at least a service specific unit supporting services and at least a service infrastructure manager, a service being univocally determined by a service identification. According to the invention, the method comprises the steps of:

triggering the service switching unit to request a service;
   sending a service request message from the service switching unit to the infrastructure manager comprising a service identification,
   identifying at the infrastructure manager, by means of the service identification, a service specific unit supporting the service;
   establishing a direct dialog between the service switching unit and the service specific unit.

8 Claims, 2 Drawing Sheets

METHOD FOR PROVIDING A SERVICE IN A TELECOMMUNICATION NETWORK AND A CORRESPONDING INFRASTRUCTURE MANAGER

BACKGROUND OF THE INVENTION

The invention relates to a process for providing services in a telecommunication network in accordance with IN architecture (IN=intelligent network), as described for example in the article "Intelligent Network Products ", published in "Electrical Communication", Vol., 63, No. 4, 1989, p. 321 to 330, by J. P. Euzen and J. B. Kérihuel.

A telecommunications network comprises a plurality of service switching units (SSP), usually part of a service exchange, which are connected via signalling system number 7 to a plurality of service control units (SCP) forming a service control plane of the telecommunication network. Services are provided for subscribers of the telecommunication network. The service switching unit detects specific trigger events, for example a special prefix dialed by a subscriber, which indicates that a calling subscriber requires access to an IN service. If, upon the establishment of a connection in which it is a participant, a service switching unit detects such a trigger event, it transmits a service request message to the service control unit which has a service logic function for the required IN service. The service logic function represents a control program which, as soon as it is activated by the service request message, controls the execution of the required IN service. For the provision of the required IN service, the activated service logic function of the service control unit then interacts with the service switching unit. When the required IN service has been provided, the dialog between service switching unit and service control unit and the execution of the service logic program are terminated.

A known improvement of the above described classical IN architecture is based on the principle of splitting the service control plane, which controls the provision of services in a telecommunications network of an operator, into a two-layer structure. For each service request message, an infrastructure manager (LL-SCP), introduced as lower layer of the service control plane, is responsible for pure network functionality. Then, the infrastructure manager distributes the service request message to one of the service control units, introduced as upper layer of the service control plane, and responsible for pure service functionality.

This improvement facilitates an open service. Complex service scenarios are thus rendered possible. Service number portability functions are typically provided by the infrastructure manager. The service management is thereby simplified and the service specific units are relieved of these infrastructure tasks, which can thus be executed more rapidly.

In a 2-layer IN architecture, the provision of services is, as known from prior art, based on application relay. FIG. 1 represents a flow diagram illustrating the provision of a IN service based on application relay. A subscriber terminal T, for example a PSTN or a ISDN terminal, of a IN-capable telecommunication exchange wants to access a service offered by the telecommunication network. When the service number dialed by the subscriber is received at an IN-capable exchange of the telecommunication network, a service switching unit SSP is triggered and generates a service request message comprising a service identification univocally determining the service corresponding to the dialed service number. The service identification is preferably the service number itself of the required service. The service request message is transmitted over a signaling transfer point STP to a service control plane of the telecommunication network comprising an infrastructure manager LL-SCP and a service specific unit HL-SCP. The service request message is first transmitted to the infrastructure manager LL-SCP. A first dialog following the paths 11, 12, 13, 14 is established between the service switching unit SSP and the infrastructure manager LL-SCP. The infrastructure manager executes network specific functions, for example determine the address of the service specific unit HL-SCP by which the service requested in the service request message has to be provided. The infrastructure manager LL-SCP then establishes, in parallel to the first dialog, a second dialog following the paths 15, 16, 17, 18 over the signalling transfer point STP to the appropriate service specific unit HL-SCP which in turn execute a service logic function for the required IN service. The two dialogs remain active during the whole duration of the service provision and all messages between the service switching unit SSP and the service specific unit HL-SCP have to follow successively the paths 11, 12, 15, 16, 17, 18, 13, 14 over the infrastructure manager LL-SCP.

It is also particularly advantageous to provide INAP converter functions (INAP=intelligent network application protocol) in the infrastructure manager LL-SCP. In this way, cooperation between products of different producers and the use of existing devices is facilitated.

SUMMARY OF THE INVENTION

The object of the invention is to decrease the load on the infrastructure manager by providing IN-services in an improved manner in a telecommunications network.

This object is achieved by a method for providing services in a telecommunications network comprising at least a service switching unit able to access a service control plane comprising at least a service specific unit supporting services and at least a service infrastructure manager, a service being univocally determined by a service identification. The method comprising the steps of:

triggering the service switching unit to request a service;

sending a service request message from the service switching unit to the infrastructure manager comprising a service identification, identifying at the infrastructure manager, by means of the service identification, a service specific unit supporting the service;

establishing a direct dialog between the service switching unit and the service specific unit.

The invention is based on the principle of splitting the provision of a service in a telecommunication network relying on a 2-layer IN architecture in a set-up phase and a service provision phase. During the set-up phase, a dialog is established between the service switching unit and the infrastructure manager. The set-up phase is dedicated to determine all necessary network parameters to have the requested service be provided without further access to the infrastructure manager. During the service provision phase, another dialog is established directly between the service switching unit and the service specific unit. During the service provision phase, the messages are advantageously no more transiting over the infrastructure manager.

As a consequence the infrastructure manager is relieved from the task of purely transparently forwarding messages once the network parameters have been determined. It is not the case in the prior art related to application relay.

A further advantage is that the infrastructure manager is further decoupled from the service specific unit and that the resources used to process a service call are no more blocked during the whole service call duration.

These advantages are achieved without the need to change existing standards in this area (IN-architecture, IN=intelligent network), which permits fast and cost-efficient implementation.

Advantageous developments of the invention are described in the sub-claims.

The present invention also concerns an infrastructure manager and a service control plane comprising means to support the method according to the present invention.

Other characteristics and advantages of the invention will appear on reading the following description of a preferred implementation given by way of non-limiting illustration and from the accompanying drawings in which:

BRIEF DESCRIPTION OF THE DRAWINGS

FIG. 1 has already been described in relation with prior art.

FIGS. 2 and 3, as FIG. 1, represent a subscriber terminal T, a service switching unit SSP part of a IN-capable telecommunication exchange, a signaling transfer point STP and a service control plane comprising an infrastructure manager LL-SCP and a service specific unit HL-SCP.

DETAILED DESCRIPTION OF EMBODIMENTS

The connection between the service switching unit SSP, the signaling transfer point STP, as well as the connection between the signaling transfer point and the infrastructure manager LL-SCP, on the one hand, and between the signaling transfer point and the service specific unit HL-SCP, on the other hand, are supporting signaling system number 7. Alternatively, the connections may support Internet Protocol, the message exchanged on theses links being encapsulated in IP packets.

Figure 1:
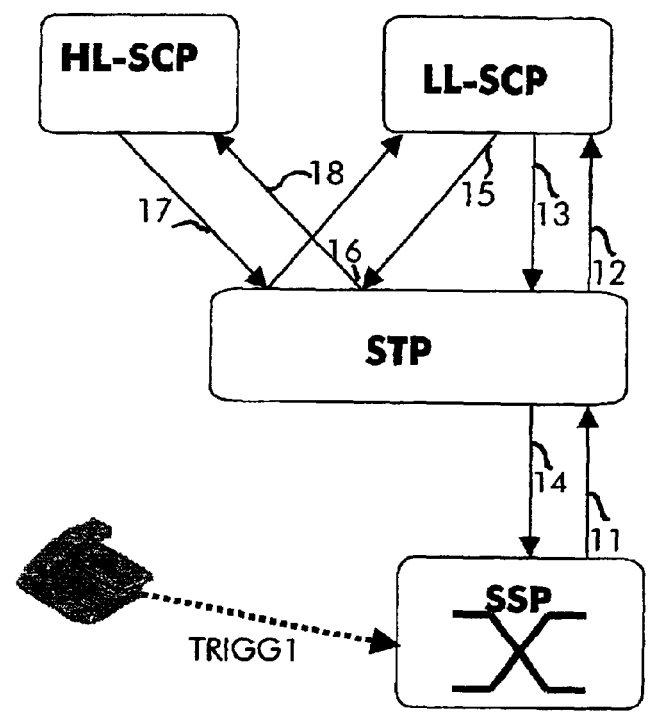
FIG. 1 is a flow diagram representing application relay according to prior art in a portion of a telecommunication network with a 2-layer-IN service control plane.
Figure 2:
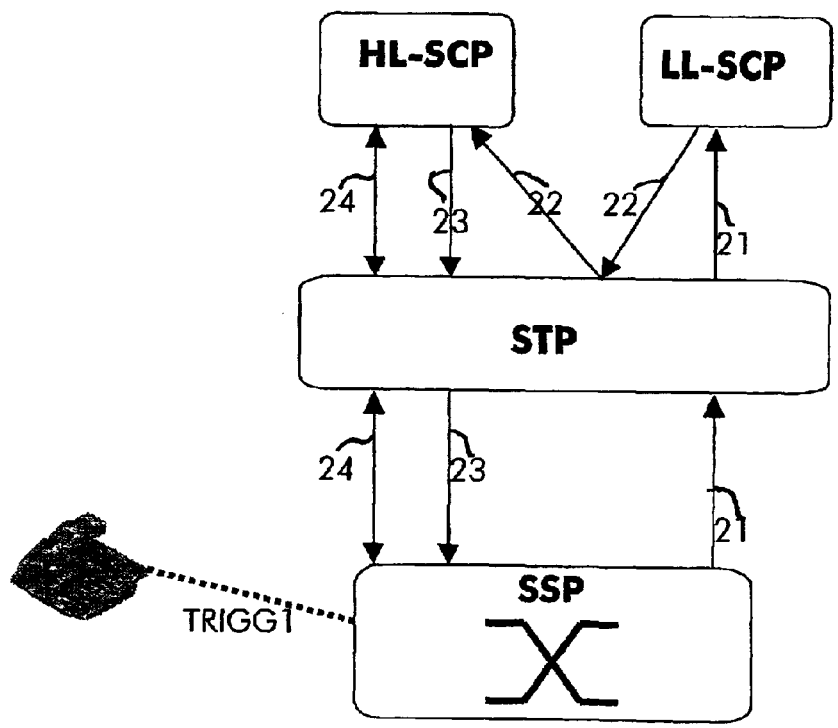
FIG. 2 is a flow diagram representing a first implementation of the method according to the present invention in a portion of a telecommunications network with a 2-layer-IN service control plane.
Figure 3:
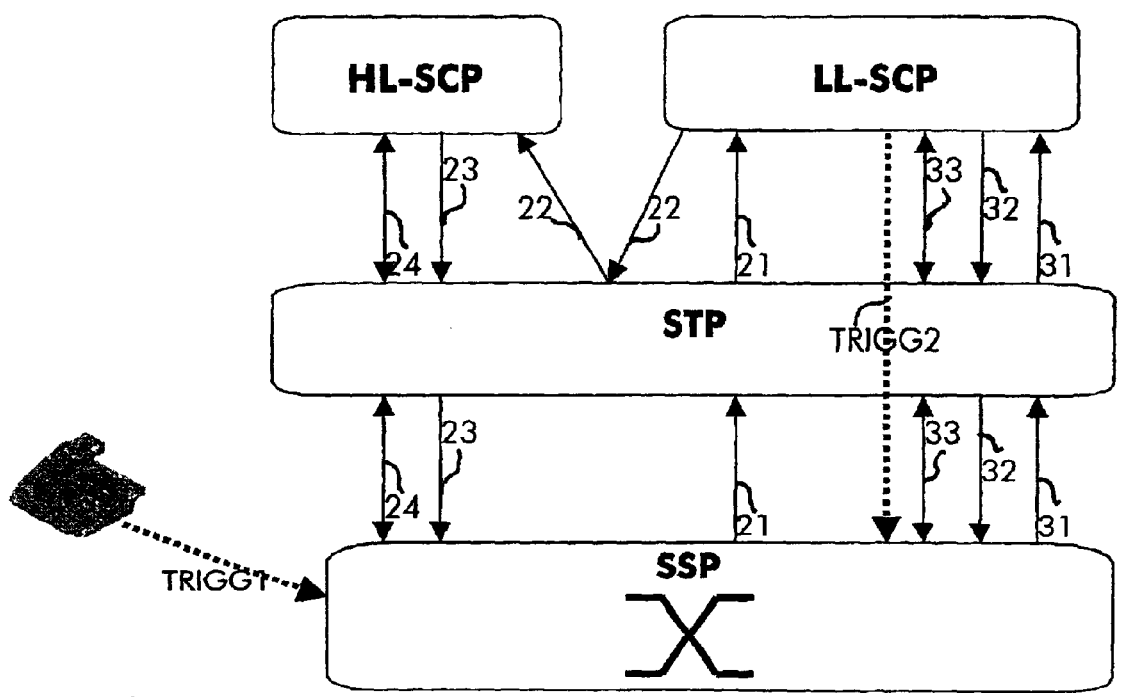
FIG. 3 is a flow diagram representing a second implementation of the method according to the present invention in a portion of a telecommunications network with a 2-layer-IN service control plane.

The service control plane comprises in general more than one infrastructure manager and more than one service specific unit which are not represented on FIGS. 2 and 3 for sake of simplicity.

The signaling transfer point is optional in the implementation of the invention. The signaling transfer point STP functionality may be located in the different impacted parts: service switching unit SSP, infrastructure manager LL-SCP and service specific manager HL-SCP. If the signaling transfer point is a stand-alone module, several signaling transfer points may be used by the different impacted parts. The configuration shown on FIGS. 2 and 3 where a single signaling transfer point is used by the service switching unit SSP the infrastructure manager LL-SCP and the service specific unit HL-SCP is not the general case.

All elements of a two layer IN architecture, e.g. service switching units, infrastructure managers, service specific units, signaling transfer points are provided with a unique service center address identifying univocally the elements of the IN architecture. Alternatively, when Internet protocol is used, a unique IP address univocally identify the elements of the IN architecture.

The connection between subscriber terminal T and the service switching unit SSP is for sake of simplification not detailed, any type of access to a telecommunication network may be considered. For example the subscriber terminal T may be a PSTN or a ISDN terminal connected to an exchange of a fixed telecommunication network. Alternatively, the subscriber terminal T can be a radio terminal connected over wireless access to the telecommunication network. Any other components of a communication network not represented, for example local exchanges or non-IN capable exchanges, may be located between subscriber terminal T and service switching unit SSP.

A first implementation of the method according to the present invention is showed on a flow diagram illustrated on FIG. 2.

When subscriber terminal T wants to access a service offered by the telecommunication network it dials the service number corresponding to the required service.

The service switching unit SSP of an IN-capable exchange is triggered by a triggering event TRIGG1 upon the reception of a dialed service number and generates a service request message 21 comprising a service identification univocally determining the service corresponding to the dialed service number. The service identification is preferably the dialed service number itself. In this first implementation of the invention, the entire service number is received by the service switching unit SSP before generating the service request message 21. This is, for example, the case if the user dials the service number fast enough or if the user uses block dialing features supported in ISDN terminals. The service request message 21 also comprises the service center address univocally determining the service switching center SSP at the origin of the service request message 21.

The service request message 21 is transmitted to the signaling transfer point STP which transparently forwards it to the infrastructure manager LL-SCP. The infrastructure manager comprises tables to determine, depending on the service identification contained in the service request message, the service specific unit HL-SCP which supports the provision of the requested service. The service specific unit HL-SCP is univocally determined by its service center address SCA. Once this mapping has been established, the infrastructure manager LL-SCP transmits a modified service request message 22 containing the service center address of the service specific unit HL-SCP over the signaling transfer point STP to the appropriate service specific unit HL-SCP. The service specific unit HL-SCP extracts from the service request message 22 the service center address of the service switching unit SSP requiring the provision of a service and sends a service acknowledgement message 23 over the service transfer point STP to the service switching unit SSP specified in the modified service request message 22. The service request acknowledgement message contains also the service center address of the service specific unit HL-SCP. When receiving the service acknowledgement message 23, the service switching unit SSP extracts the service center address of the HL-SCP able to provide the service requested by the service switching point SSP. From now on, a dialog is established between the service switching unit SSP and the service specific unit HL-SCP since both of them have the knowledge of the service center address of its communication partner and can directly address it without requesting the help of the infrastructure manager LL-SCP.

As a consequence, further messages 24 belonging to the dialog for the provision of the requested service no more overload the link between the signaling transfer point and the infrastructure manager and the infrastructure manager itself.

For example further messages 24 may indicate the choice of an option proposed by the service specific unit or a further information such as a password or a PIN number.

FIG. 3 illustrates a flow diagram showing a second implementation of the method according to the present invention.

When subscriber terminal T wants to access a service offered by the telecommunication network, it dials the service number corresponding to the required service. In this embodiment of the invention, only a part of the service number dialed at the subscriber terminal is received at an IN-capable exchange of the telecommunication network. This is the case when the user dials slowly and X first digits only, for example the complete prefix, of the service number trigger the service switching unit. As response to the trigger TRIGG1, the service switching unit SSP generates a service request message 31 comprising a service identification but, in that case, not univocally determining the service requested since the service number is not already complete. The service identification may only indicate which class of services is requested by the user (e.g. free call, televoting, universal access, pre-paid calling card). As already described in FIG. 2 the service request message 31 is directed by the signaling transfer point STP, to the infrastructure manager LL-SCP.

The infrastructure manager LL-SCP, when receiving the service request message 31 can't univocally determine the service specific unit HL-SCP supporting the service. The interrogation of the mapping tables detects that not enough information is available to determine univocally the service specific unit HL-SCP dedicated to provide the service. As a consequence, the infrastructure manager LL-SCP generates a service specify message 32 containing the service center address of the service switching unit SSP. This service specify message 32 is transmitted back over the signaling transfer point STP to the addressed service switching unit SSP. A first dialog is then established between the service switching unit SSP and the infrastructure manager LL-SCP. The further messages 33 exchanged during this dialog contain the missing parts of the service number already partly received by the infrastructure manager LL-SCP. The service switching unit SSP answers to the service specify messages 33 by sending a message containing further digits of the service number. As long as an entire service number, enabling it to determine univocally the address of a service specific unit HL-SCP, is not available at the infrastructure manager LL-SCP, the latter sends further service specify messages, not represented on FIG. 3, back to the service switching unit SSP and stores the already received digits in a memory.

When the complete service number is available, the LL-SCP triggers the service switching point SSP with a predefined trigger message TRIGG2 containing the complete service number of the service number reconstructed at the infrastructure manager LL-SCP. The trigger message TRIGG2 has the same effect at the service switching point as the triggering event TRIGG1 caused by the user dialing a complete service number described as first implementation of the method according to the present invention by means of FIG. 2. The further steps illustrated by the paths 21 to 24 are the same as the ones described in FIG. 2.

Optionally, the dialog between service switching point SSP and the infrastructure manager LL-SCP is released once the trigger message TRIGG2 has been issued.

Optionally the trigger message TRIGG2 contains a modified service number, obtained by inserting a predefined item in the service number. This predefined item is preferably an auxiliary digit. This is useful if the service switching point SSP is configured to ignore a further triggering event related to the same service number as the preceding one. In that case, the infrastructure manager LL-SCP is able to detect this predefined item in the service identification part of the service request message 21 and delete it for the further proceeding of the method according to the invention and already described in FIG. 2.

Figure 4:
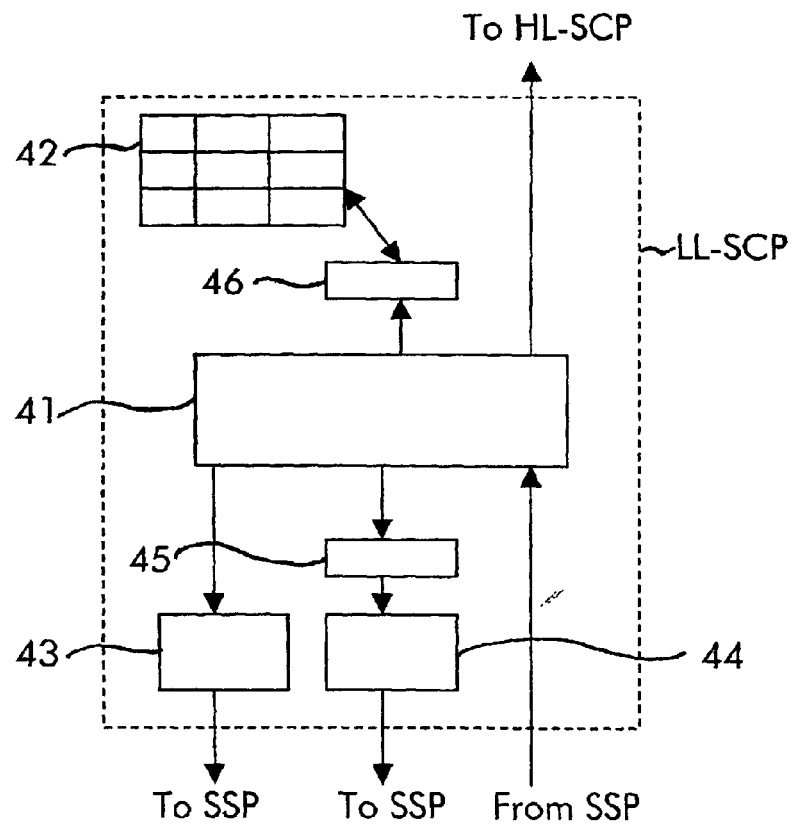
FIG. 4 is a bloc diagram of an infrastructure manager according to the invention.

FIG. 4 is a bloc diagram of an infrastructure manager according to the invention supporting the first and the second implementation of the method described above.

The infrastructure manager LL-SCP comprises a service indicator completeness detector 41, a mapping table 42, a service specify message generator 43, a trigger message generator 44, insertion means 45 and deletion means 46.

Service indicator completeness detector 41 has access to mapping table 42 and is connected to service specify message generator 43 and to trigger message generator 44. Insertion means 45 are optional and preferably located between service indicator completeness detector 41 and trigger message generator 44. Deletion means 46 are also optional and are always present in relation with insertion means 45. Deletion means preferably located between service indicator completeness detector 41 and mapping table 42.

A service request message received from a service switching unit SSP at the infrastructure manager LL-SCP is directed to service indicator completeness detector 41 which extracts the field corresponding to the service indicator of the requested service. This field is confronted to mapping table 42 which maps the contends of the service indicator field to the service center address of a service specific unit HL-SCP supporting the required service. If the service indicator is complete, the result of mapping indicates univocally the service center address of the service specific unit and a service request message can be forwarded to the appropriate service specific unit HL-SCP. On the contrary, if the contends of the service indicator field does not univocally determine a service specific unit HL-SCP, the service indicator completeness detector 41 addresses the service specify message generator 43 which generates a service specify message and sends it back to the service switching unit SSP to request missing parts of the service indicator to be provided. At service indicator completeness detector 41, the already received part of the service indicator is stored in a memory location. Missing parts of the service indicator contained in further messages received from the service switching unit SSP are appended to the contends of the memory location and the updated contends of the memory location is confronted to mapping table 42. As soon as mapping table 42 indicates that a service specific unit HL-SCP has been univocally associated to the required service, service indicator completeness detector 41 addresses trigger message generator 44, which generates a trigger message containing the complete service indicator extracted from the memory location. The trigger message generator 44 sends this message back to the service switching unit SSP.

Optionally, insertion means 45 modify the service indicator by inserting a predefined dummy digit at a predefined location in the service indicator and insert this modified service indicator in the trigger message in place of the service indicator itself. Optionally, and always in relation with insertion means, deletion means 46 delete, if necessary, a predefined dummy digit at a predefined location of a service indicator received in a service request message received from the service switching unit SSP.

What is claimed is:

1. A method for providing a service in a telecommunication network comprising at least a service switching unit (SSP) able to access a service control plane comprising at least a service specific unit (HL-SCP) supporting services and at least a service infrastructure manager (LL-SCP), said service being univocally determined by a service identification, said method comprising the steps of:

triggering said service switching unit (SSP) to request said service;

sending a service request message comprising said service identification from said service switching unit (SSP) to said infrastructure manager (LL-SCP), said method being characterized in further comprising the steps of:

identifying at said infrastructure manager (LL-SCP), by means of said service identification, a service specific unit (HL-SCP) supporting said service;

establishing a direct dialog between said service switching unit (SSP) and said service specific unit (HL-SCP).

2. A method according to claim 1, characterized in that said service switching unit (SSP) is triggered to request said service by a service number dialed at a subscriber terminal of said telecommunication network, the entire service number being available at said service switching unit (SSP) while sending said service request message.

3. A method according to claim 1, characterized in that if only a part of a service number dialed at a subscriber terminal of said telecommunication network, is available at said service switching unit (SSP), said method further comprises the steps of:

establishing a preliminary dialog between said service switching unit (SSP) and said infrastructure manager (LL-SCP) to request said service switching unit (SSP) to provide said infrastructure manager (LL-SCP) with an entire service number; and sending by said infrastructure manager (LL-SCP) to said service switching unit (SSP) a trigger message containing at least said entire service subscriber number, when said entire service subscriber number is available at said infrastructure manager (LL-SCP), said trigger message triggering said switching service unit (SSP) to request said service.

4. A method according to claim 3, characterized in releasing said preliminary dialog between said service switching unit (SSP) and said infrastructure manager (LL-SCP) when said trigger message has been received by said service switching unit (SSP).

5. A method according to claim 3, characterized in that a dummy digit is inserted in said entire service subscriber number contained in said trigger message.

6. An infrastructure manager (LL-SCP) to be part of a control plane of a telecommunication network, said infrastructure manager (LL-SCP) receiving a service request message from a service switching unit (SSP) said infrastructure manager being characterized in that it further comprises:

means (41) for detecting, if an entire service number is contained in said service request message;

means (43) for requesting a missing part of said service number; and means (44) for sending a trigger message to said switching service unit (SSP) once the entire service number has been reconstructed at said infrastructure manager, said trigger message containing at least said entire service number.

7. An infrastructure manager according to claim 6, characterized in that it further comprises means (45) for inserting a predefined dummy digit at a predefined location of said service number sent in said trigger message.

8. An infrastructure manager according to claim 6, characterized in that it further comprises means (46) for deleting said predefined dummy digit from said predefined location of said service number received in said service request number.

* * * * *